United States Patent [19]
Costes

[11] 3,988,202
[45] Oct. 26, 1976

[54] NUCLEAR REACTOR OF PRESSURIZED LIQUID COOLANT TYPE

[75] Inventor: Didier Costes, Paris, France

[73] Assignee: Commissariat a l'Energie Atomique, Paris Cedex, France

[22] Filed: Mar. 22, 1974

[21] Appl. No.: 453,966

[30] Foreign Application Priority Data
Mar. 30, 1973   France............................. 73.11588

[52] U.S. Cl.................................... 176/52; 176/87
[51] Int. Cl.².......................................... G21C 15/00
[58] Field of Search.................. 176/51, 52, 53, 61, 176/62, 63, 65, 87

[56] References Cited
UNITED STATES PATENTS

| | | | |
|---|---|---|---|
| 3,205,145 | 9/1965 | Margen................ | 176/53 |
| 3,245,879 | 4/1969 | Purdy et al. ......... | 176/53 |
| 3,305,450 | 2/1967 | Maldague ............. | 176/52 |
| 3,312,595 | 4/1967 | Hackney............... | 176/52 |
| 3,312,596 | 4/1967 | Grain................... | 176/50 |
| 3,372,092 | 3/1968 | Margen................ | 176/52 |
| 3,442,759 | 5/1969 | Molle et al............ | 176/36 R |
| 3,470,066 | 9/1969 | Livsey et al........... | 176/87 |
| 3,551,289 | 12/1970 | Eich et al.............. | 176/36 |
| 3,821,079 | 6/1974 | Jabsen ................. | 176/65 |

FOREIGN PATENTS OR APPLICATIONS

| | | | |
|---|---|---|---|
| 968,889 | 9/1964 | United Kingdom.................. | 176/52 |
| 1,199,513 | 7/1970 | United Kingdom.................. | 176/52 |

Primary Examiner—Samuel W. Engle
Assistant Examiner—S. A. Cangialosi
Attorney, Agent, or Firm—Cameron, Kerkam, Sutton, Stowell & Stowell

[57] ABSTRACT

The reactor comprises a vertical concrete pressure vessel, a bell-housing having an open lower end and disposed coaxially with the interior of the pressure vessel so as to delimit therewith a space filled with gas under prssure for the thermal insulation of the internal vessel wall, a pressurizing device for putting the coolant under pressure within the bell-housing and comprising a volume of control gas in contact with a large free surface of coolant in order that an appreciable variation in volume of liquid displaced within the coolant circuit inside the bell-housing should correspond to a small variation in pressure of the control gas.

9 Claims, 3 Drawing Figures

NUCLEAR REACTOR OF PRESSURIZED LIQUID COOLANT TYPE

This invention relates to a nuclear reactor which is cooled by a pressurized liquid, that is to say in which the coolant consisting of water in the great majority of cases is continuously maintained at a higher pressure than the pressure of vaporization of said coolant at the maximum operating temperature. The invention is more especially concerned with a device for regulating the pressure of the coolant liquid as a function of variations in reactor load, the primary objective of said device being to ensure instantaneous admission or withdrawal into or from the coolant circuit of a suitable quantity of coolant which is capable of compensating for a reduction or an increase in the total volume arising from a temperature variation and thus to prevent the coolant from being heated to the boiling point by reason of the fluctuations of pressure which would otherwise result and be liable to have serious consequential effects on the fuel elements of the reactor core.

Different designs of devices for the automatic pressurization of a nuclear reactor coolant are already known. The most conventional designs make use of a system consisting of a container which is located outside the reactor tank and in which an equilibrium is established between the coolant and its vapor at a temperature above the temperature prevailing within the primary coolant circuit and especially within the interior of the reactor tank. The volume of liquid coolant which is present within said external container corresponds to the quantity which is necessary in order to permit design load variations during hot-state operation of the reactor and also at the time of emergency shutdown with adjustment of the temperature to its initial mean value. By way of indication and in the case of a reactor having a power rating of 1200 MWe, the quantity of water contained in the hot state within the pressurizer container is of the order of 25 m³, approximately 20 m³ of which are immediately injectable into the primary coolant circuit in order to carry out the necessary regulation of volume.

In another alternative form of construction, steps have been taken to mount the pressurizing device directly within the interior of the reactor tank above the core, the volume of the liquid coolant within the reactor tank being put under pressure by means of a mixture of gas and coolant vapor confined within a space located above the free level of coolant within the interior of the reactor tank itself.

In another order of ideas, provision has been made in nuclear reactors of the boiling coolant type, that is to say a type which is essentially different from the pressurized-coolant reactors mentioned above, for devices having the design function of ensuring thermal insulation of the reactor tank which is usually constituted by a concrete pressure vessel, said devices being intended to maintain the vessel at a limited temperature of the order of 50° C, for example, during operation of the reactor. To this end, it has already been proposed to mount within the interior of the reactor tank a bell-housing whose external wall is covered with heat-insulating material, a suitable volume of stagnant gas under a suitable pressure being established between the reactor tank and the bell-housing which surrounds the reactor core and the primary circuit of the boiling coolant. Said gas establishes a level of separation with the coolant at the bottom portion of the bell-housing and thus serves to limit the thermal flux towards the wall of the concrete pressure vessel which constitutes the reactor tank; moreover, and in order to protect the bottom of said reactor tank at the level of the open end of the bell-housing, a heat-insulating screen is advantageously placed in the vicinity of the bottom of the tank and immersed in the coolant.

The present invention is directed to a nuclear reactor of the pressurized liquid coolant type in which a thermal insulation bell-housing is combined with an integrated device within the reactor tank for pressurizing the coolant and serves to maintain the wall of said reactor tank in the cold state.

To this end, the reactor under consideration essentially comprises a concrete pressure vessel having a vertical axis, a bell-housing having an open lower end and disposed coaxially with the interior of the pressure vessel so as to delimit therewith a space filled with gas under pressure for the thermal insulation of the internal wall of said vessel, and a pressurizing device for putting the coolant under pressure within the bell-housing, comprising a volume of control gas in contact with a large free surface of coolant in such a manner as to ensure that an appreciable variation in volume of liquid displaced within the coolant circuit inside the bell-housing corresponds to a small variation in pressure of the control gas.

Depending on requirements, the control gas and the thermal insulation gas may or may not be separated and can be either of the same nature or of a different nature. However and in a preferred embodiment, the two gases are identical, the pressurizing device being constituted by an enclosure which is mounted coaxially with the bell-housing beneath the reactor core and which is open at the lower end but closed at the upper end, a volume of control gas which is in communication with the thermal insulation gas being imprisoned within the upper end of said enclosure above the level of the coolant liquid. As an advantageous feature and irrespective of the form of construction adopted, means are provided for collecting the condensation fractions of the coolant liquid in the volume of control gas and returning it into the primary circuit within the interior of the bell-housing.

In another alternative embodiment, the bell-housing is provided at the open end thereof with a narrowed portion which leaves a space of substantial width for the level of coolant liquid between the base of the bell-housing and the reactor vessel, with the result that the control gas directly constitutes the thermal insulation gas.

Apart from the characteristic features mentioned in the foregoing, a liquid-cooled nuclear reactor as constructed in accordance with the invention offers a number of additional related features which are preferably to be considered in combination but may be considered separately if necessary and concern in particular the following points:

the open enclosure of the pressurizing device is suspended beneath an internal casing which contains the reactor core and the lower end of which is provided with perforations for the passage of coolant which flows upwards through the reactor core;

the open enclosure of the pressurizing device is carried by a hollow perforated central column anchored at the lower end thereof in the bottom of the concrete reactor vessel, said column being provided with an extension above the upper end of the enclosure in the form of a safety structure for supporting the casing which contains the reactor core in the event of falling of said core;

vertical immersion tubes serve to equalize the temperatures by establishing a communication between the coolant located above and outside the pressurizer enclosure and the coolant contained within said enclosure beneath the volume of control gas;

the open enclosure of the pressurizing device communicates with a storage reservoir for the injection and recirculation of the control gas. Said storage reservoir is preferably constituted by a series of containers embedded within the concrete wall of the reactor vessel;

the bell-housing is provided at the open end thereof with a concentric skirt which delimits with said bell-housing an annular chamber filled with stagnant gas, said chamber being interposed between the thermal insulation space and the pressurizing device.

Further properties of a nuclear reactor as constructed in accordance with the invention will become apparent from the following description of a number of exemplified embodiments which are given by way of indication without any limitation being implied, reference being made to the accompanying drawings, in which.

Figure 1:
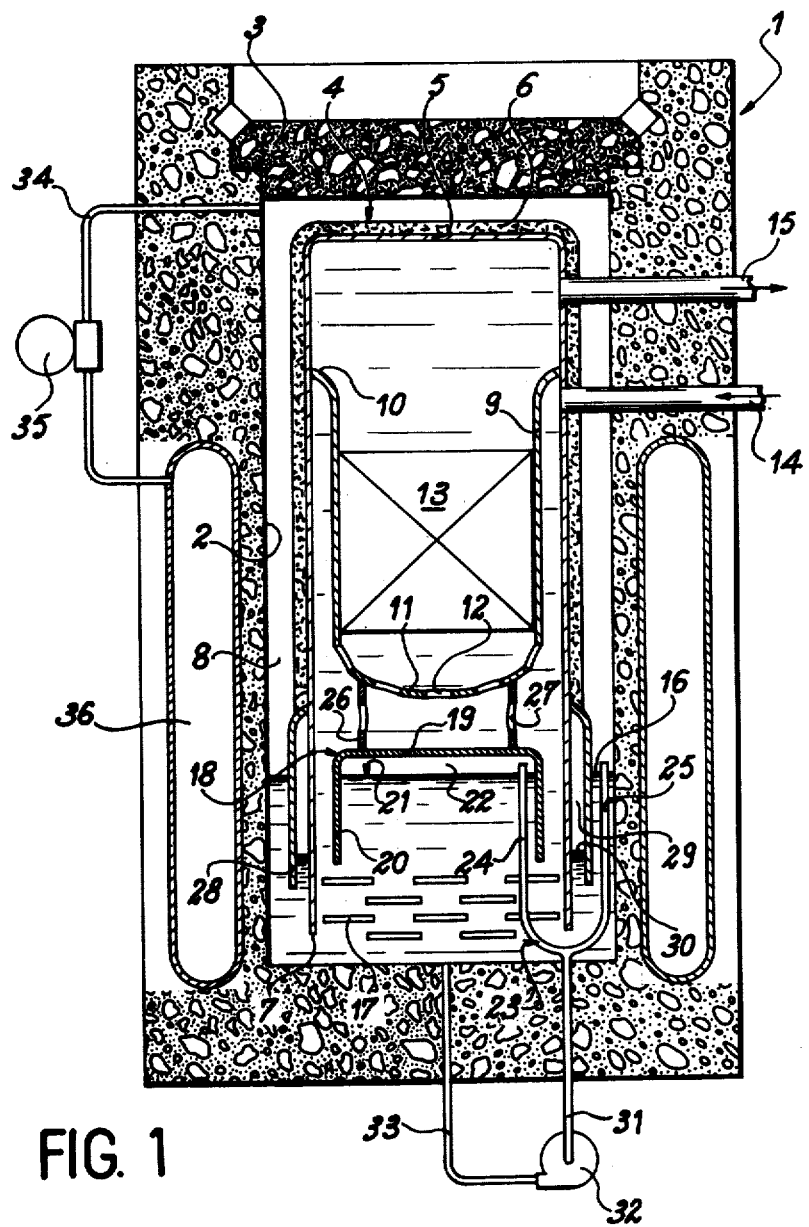
FIG. 1 is a diagrammatic longitudinal sectional view of a nuclear reactor of the pressurized liquid coolant type in accordance with the invention.

The essential parts of a nuclear reactor of the type cooled by a liquid under pressure and especially water are illustrated in a very general manner in FIG. 1. This reactor comprises an external pressure vessel 1 constructed of prestressed concrete and delimiting by means of its internal wall 2 a cavity within which are mounted the main reactor components, said cavity being closed at the top end by a concrete slab 3. There is placed in particular within the above-mentioned cavity a bell-housing 4 comprising a metallic wall 5 covered externally with a suitable layer of heat-insulating material 6. Said bell-housing 4 is suspended within the interior of the reactor vessel 1 by means (not shown in the drawings), with the result that the open lower end 7 of said housing is located at a relatively small distance from the bottom of the reactor vessel 1. The bell-housing 4 delimits with the internal wall 2 of the reactor vessel 1 an annular space 8 filled with a thermal insulation gas under a suitable pressure; said gas can consist in particular of nitrogen or argon and makes it possible to maintain the temperature of the wall 2 at a value of the order of 50° C during operation. The shell 9 of a support casing is suspended within the interior of the bell-housing 4 and joined to the internal wall of this latter by means of gussets 10. Said shell 9 terminates in a perforated bottom portion 11 which is provided with a series of orifices 12 for the passage of liquid coolant of the reactor, the core 13 of which is mounted within the interior of said shell and suspended from the bell-housing 4. The water which serves to cool the reactor core 13 penetrates into the reactor vessel 1 and the bell-housing 4 through an admission duct 14, circulates between the shell 9 and the internal wall 5 of the bell-housing 4, traverses the bottom portion 11 through the orifices 12, penetrates into the base of the reactor core 13, then flows out of this latter at the top portion before being discharged from the bell-housing 4 and the reactor vessel 1 through an outlet duct 15. During normal operation, the pressure of the thermal insulation gas within the space 8 is chosen such that the level of the coolant liquid within said space has a free surface 16 located above the lower end 7 of the bell-housing 4. Finally, in order to permit suitable insulation of the bottom end-wall of the reactor vessel 1 at the level of the open portion of the bell-housing 4, provision is made for a heat-insulating screen 17 which is placed beneath said bell-housing and operates under water. Said screen is made up of alternate horizontal plates which serve to promote natural thermal stratification of the coolant without preventing vertical transfers. Preferably, the lower end 7 of the bell-housing 4 coincides with the level of the bottom plates of the screen 17.

In accordance with the invention, the pressurized liquid-cooled reactor which is thus constructed is associated with a device for pressurizing the coolant. In the example of construction which is illustrated, said device is constituted by an open enclosure 18 having a top horizontal wall 19 located beneath the bottom portion 11 of the shell 9 and a lateral annular wall 20. Said enclosure 18 thus delimits between its wall 19 and the free surface 21 of the coolant within the bell-housing 4 a space 22 in which is imprisoned a suitable volume of a control gas. Said gas is preferably identical with the thermal insulation gas contained in the space 8 and is put into communication with this latter via a U-shaped pipe 23, the arms 24 and 25 of which open respectively into the space 22 at one end and into the space 8 at the other end. The enclosure 18 is mounted so as to be suspended from the bottom portion 11 of the shell 9 by means of a cylindrical sleeve 26 provided with throughholes 27 so as not to hinder the free circulation of coolant. Finally, in order to permit enhanced thermal insulation in the bottom portion of the bell-housing 4, this latter is preferably duplicated by a cylindrical skirt 28, thus forming an intermediate space 29 filled with a suitable volume of stagnant gas, the pressure of which is such that the free level 30 of the coolant is brought below the identical levels 16 and 21. At the lower end, the communication tube 23 is connected to a pipe 31 for recovering the vapor fractions of the coolant liquid which are condensed and collected by the pipe 23. Said pipe 31 is connected to a recycling pump 32 which returns said condensed fractions through a pipe 33 into the reactor vessel 1 beneath the thermal screen 17. Finally, the equipment of the reactor is completed by means of a pipe 34 which is connected to the space 8 formed between the bell-housing 4 and the internal wall 2 of the reactor vessel 1. Said pipe 34 is connected by means of a compressor and pressure reducer unit 35 to a storage reservoir 36 or preferably to a series of reservoirs of this type which are suitably disposed and embedded within the thickness of the reactor vessel 1.

At the time of operation of the reactor which is thus constructed, the arrangements under consideration make it possible while maintaining a suitable thermal insulation of the concrete pressure vessel by means of the gas contained between the bell-housing and the vessel to ensure automatic regulation of the pressure of the coolant liquid by virtue of an immediate variation in pressure of the control gas within the space 22, thus resulting in a limited variation of the free levels 21 and 16. At the time of occurrence of any variation in load which produces a variation in temperature and consequently in specific density of the coolant within the circuit, the pressurizing device responds immediately by an admission into or a withdrawal from the circuit of a suitable volume of liquid such that the pressure of coolant is always maintained above the pressure of vaporization in respect of the temperature considered. The make-up quantity of gas which is necessary within the space 22 can be supplied either by expansion of the thermal insulation gas if the volume of the space 8 is sufficient or by an external addition supplied in particular from the reservoirs 36 via the pipe 34.

Figure 2:
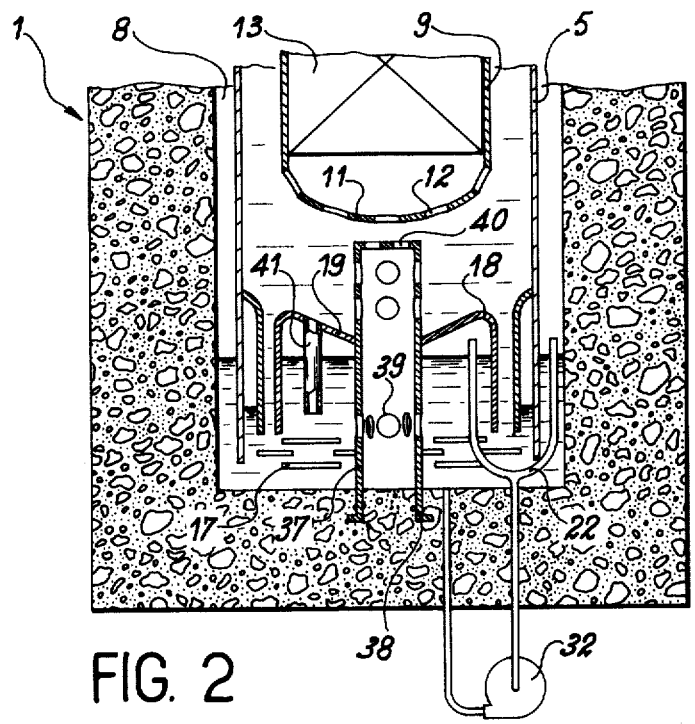
FIGS. 2 and 3 are partial longitudinal sectional views of two alternative embodiments of the reactor under consideration.

In the alternative embodiment illustrated in FIG. 2, the same reference numerals have again been employed to designate components which are similar to those of the example shown in FIG. 1. In this alternative embodiment, the enclosure 18 of the pressurizing device is rigidly fixed by means of its bottom wall 19 to a hollow column 37, the lower end 38 of which is anchored in the concrete endwall of the pressure vessel 1, said column being provided with perforations 39 so as to permit free circulation of the coolant liquid. Said column is provided with an extension at the upper end thereof in the form of a safety structure 40 which is placed beneath the bottom portion 11 of the shell 9 which surrounds the reactor core 13. Said structure makes it possible to receive the reactor core in the event of a major accident condition and serves in particular to prevent this latter from falling towards the bottom portion of the pressure vessel 1. In this alternative embodiment, the enclosure 18 is wholly independent of the bell-housing 4, thus permitting removal of this latter for inspection purposes. Since the temperature within the enclosure 18 of the pressurizer is liable to be appreciably lower than that of the water which penetrates into the shell 9 beneath the reactor core 13, it is worthy of note that provision is advantageously made for immersion tubes such as the tube 41 which are mounted so as to establish a coolant by-pass and to equalize the temperatures without hindering the operation of the pressurizer itself.

Figure 3:
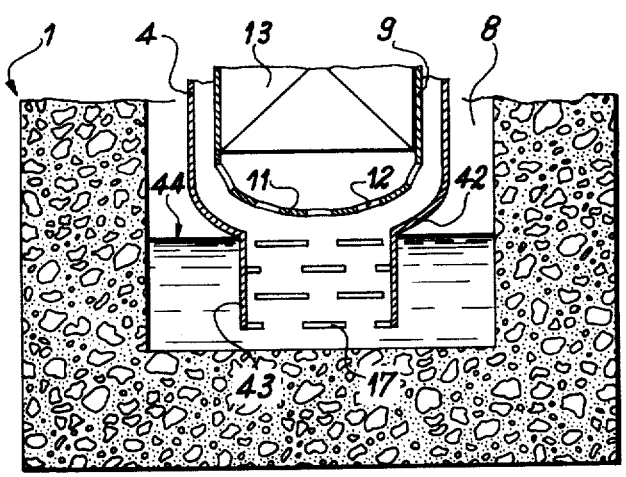

In the alternative embodiments illustrated in FIGS. 1 and 2, the coolant which penetrates into the bottom of the bell-housing is at a relatively low temperature; however, said coolant is in communication with the coolant of the main circuit which is delimited by the admission and discharge ducts 14 and 15 through the permeable thermal screen 17. When the pressurizer is put into operation, said screen therefore makes it possible to admit into the circuit water which is relatively lukewarm and not cold. If the operation of the reactor permits an admission of cold water, the practical design of the complete assembly can accordingly be simplified in the manner shown in FIG. 3 by optimizing the corresponding cross-section of the lower portion of the bell-housing 4. To this end, said bell-housing is provided at the lower end with a narrowed portion 4 terminating in a sleeve 43 which surrounds the thermal screen 17. Said narrowed portion delimits at the bottom of the space 8 a free level 44 of coolant liquid, the dimension of which is sufficient to ensure that the variations in pressure of the gas within the space 8 result in pressurization of the coolant circuit itself. In all cases, pressure-limiting valves can be carried by the reactor vessel 1 in communication with the thermal insulation gas or by the piping systems which connect the pressurizer to the exterior of the reactor vessel.

As is readily apparent from the foregoing, the invention is not limited in any sense to the exemplified embodiments which have been more especially described with reference to the accompanying drawings but extends on the contrary to all alternative forms.

I claim:

1. A pressurized liquid coolant nuclear reactor comprising a concrete pressure vessel having an internal wall and a vertical axis, a bell-housing having an open lower end and disposed coaxially with the interior of the pressure vessel so as to delimit therewith a space filled with gas under pressure for the thermal insulation of the internal wall of said vessel, a source for the thermal insulating gas, pressurizing means for placing said thermal insulating gas under pressure in said space, a pressurizing device for putting the coolant under pressure within the bell-housing, comprising a volume of control gas in contact with a large free surface of coolant in such a manner as to ensure that an appreciable variation in volume of liquid displaced within the coolant circuit inside the bell-housing corresponds to a small variation in pressure of said control gas, the pressurizing device further including an enclosure mounted coaxially with the bell-housing beneath the reactor core and open at the lower end and closed at the upper end, a volume of control gas contained within the upper end of said enclosure above the level of the coolant liquid and communication means for placing the upper end of said enclosure in communication with said space filled with gas under pressure wherein variation of the pressure of said thermal insulating gas by said pressurizing means in turn causes a variation in said control gas pressure through said communication means.

2. A nuclear reactor according to claim 1 including means for collecting the condensation fractions of the coolant liquid in the volume of control gas and for returning it within the interior of the bell-housing.

3. A nuclear reactor according to claim 1, including vertical immersion tubes equalizing the temperatures by establishing a communication between the coolant located above and outside the pressurizer enclosure and the coolant contained within said enclosure beneath the volume of control gas.

4. A nuclear reactor according to claim 1, wherein the open enclosure of the pressurizing device is suspended beneath an internal casing which contains the reactor core and the lower end of which is provided with perforations for the passage of the coolant which flows upwards through the reactor core.

5. A nuclear reactor according to claim 1, wherein the open enclosure of the pressurizing device is carried by a hollow perforated central column anchored at the lower end thereof in the bottom of the concrete reactor vessel, said column being provided with an extension above the upper end of the enclosure in the form of a safety structure for supporting the casing which contains the reactor core in the event of falling of said core.

6. A nuclear reactor according to claim 1, wherein the open enclosure of the pressurizing device communicates with at least one storage reservoir for the injection and recirculation of the control gas.

7. A nuclear reactor according to claim 6, wherein the storage reservoir is embedded within the concrete wall of the reactor vessel.

8. A nuclear reactor according to claim 1, wherein the inverted bell-housing is provided at the open end thereof with a concentric skirt which delimits with said bell-housing an annular chamber filled with stagnant gas, said chamber being interposed between a thermal insulation space and the pressurizing device.

9. A pressurized liquid coolant nuclear reactor comprising a concrete pressure vessel having an internal wall and a vertical axis, a bell-housing having an open lower end and disposed coaxially with the interior of the pressure vessel so as to delimit therewith a space filled with gas under pressure for the thermal insulation of the internal wall of said vessel a source for the thermal insulating gas, pressurizing means for placing said thermal insulating gas under pressure in said space, a pressurizing device for putting the coolant under pressure within the bell-housing, comprising a volume of control gas in contact with a large free surface of coolant in such a manner as to ensure that an appreciable variation in volume of liquid displaced within the coolant circuit inside the bell-housing corresponds to a small variation in pressure of said control gas, the pressurizing device further including an enclosure mounted coaxially with the bell-housing beneath the reactor core and open at the lower end and closed at the upper end, a volume of control gas contained within the upper end of said enclosure above the level of the coolant liquid and communication means for placing the upper end of said enclosure in communication with said space filled with gas under pressure, said inverted bell-housing having at the open end thereof a narrowed portion providing a space of substantial width for the level of coolant liquid between the base of said bell-housing and the reactor vessel wherein variation of the pressure of said thermal insulating gas by said pressurizing means in turn causes a variation in said control gas pressure through said communication means.

* * * * *